Sept. 17, 1940.  R. G. AREY  2,214,850
SELF-STARTING SYNCHRONOUS MOTOR
Filed June 3, 1939
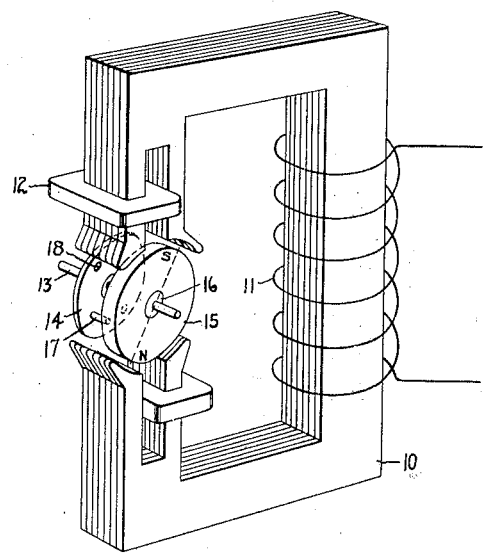
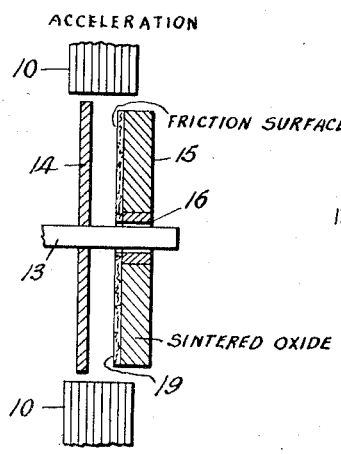
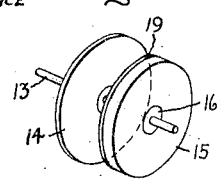
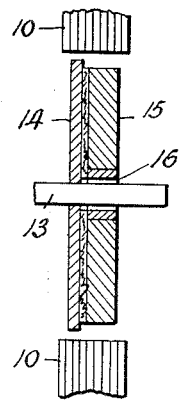
Inventor:
Ralph G. Arey,
by Harry E. Dunham
His Attorney.

Patented Sept. 17, 1940

2,214,850

UNITED STATES PATENT OFFICE

2,214,850

SELF-STARTING SYNCHRONOUS MOTOR

Ralph G. Arey, Swampscott, Mass., assignor to General Electric Company, a corporation of New York Application June 3, 1939, Serial No. 277,248

7 Claims. (Cl. 172—278)

My invention relates to self-starting synchronous motors and its object is to increase the starting and pull-out torque, as well as the power factor and efficiency of such motors.

In United States Letters Patent No. 1,497,394, June 10, 1924, to Henry E. Warren, there is described a motor having a two-element rotor, one element being designed to produce strong starting characteristics and the other element having salient poles to produce strong synchronizing characteristics. The polar rotor element is screw-threaded on the shaft and is intended to turn on the shaft so as to be moved axially out of the field during the starting period, then to be started by the other rotor, and to return within the field when it has been synchronized. My invention may be considered to be an improvement of such a motor.

However, I make the synchronous rotor element a permanent magnet which is preferably self-starting and depend upon magnetic repulsion and attraction for moving the synchronous rotor element from and returning it within the influence of the rotating magnetic field.

My synchronous rotor element assists instead of detracts from the motor starting torque when it is made inherently self-starting. The starting torque of the motor is greatly increased by such an arrangement. The motor starting is much faster than in the prior motor mentioned and the construction and operation is simplified. Since the synchronous rotor element is a permanent magnet, the pull-out torque efficiency and power factor of the motor are also greatly increased.

The features of my invention which are believed to be novel and patentable will be pointed out in the claims appended hereto. For a better understanding of my invention, reference is made in the following description to the accompanying drawing in which Fig. 1 represents a perspective view of a preferred form of my invention with the rotor elements of the motor separated, as they will be during the accelerating period; Fig. 2 represents a rotor element employing a friction disk between the two torque elements thereof and Figs. 3 and 4 represent the relative positions of the two rotor elements during acceleration and synchronous operation, respectively.

Referring to Fig. 1, 10 represents a bi-polar stator field member made up of magnetic laminations. 11 is the single phase energizing winding and 12 designates shading coils on the split poles of the stator to give the flux across the rotor air gap a rotating component. Thus the stator may be of the simple shaded pole, bi-polar variety.

The rotor shaft is represented at 13 and has secured to it the rotor element 14 of strong starting characteristics. Rotor element 14 may be a steel disk sufficiently hardened to produce good hysteresis torque and it then starts by hysteresis torque action. The rotor shaft bearings have been omitted for the sake of clearness, but it is to be understood that the rotor shaft does not need to have more than normal end play. The shaft 13 and rotor element 14 are intended to remain in approximately one endwise position where rotor element 14 is within the influence of the rotating magnetic field at all times but preferably slightly to the left center of the field as here represented.

15 represents a permanent magnet rotor element which is free to slide endwise on the shaft 13 and to turn with respect thereto when not in driving connection with rotor element 14. Element 15 may be a disk of sintered oxide polarized across a diameter, as represented by the N and S polarity indications thereon. Preferably, it is provided with a suitable metal bushing 16 about shaft 13.

As explained in United States Patent 2,101,665, December 7, 1937, to Faus and myself, a polarized sintered oxide rotor is light in weight and is inherently self-starting either in a shaded pole field or in a single phase field having no rotating component. The rotor 15 may be made in accordance with the teachings of Patent 2,101,665 by mixing together finely powdered magnetic, ferric oxide and cobaltic oxide in the proportions of two molecules of magnetite, two molecules of ferric oxide and one molecule of cobaltic oxide, then molding to shape under great pressure. The material is then heat-treated and magnetized and ground to exact dimensions, if necessary.

In the form of the invention shown in Fig. 1 rotor element 15 has a pin 17 secured therein extending towards rotor element 14, which pin is adapted to fit loosely in a hole 18 in rotor element 14 to establish a driving connection between the rotor elements when they are in such relatively rotary positions as to align the pin with the hole and are drawn together. I may provide one or more spaced holes 18 in rotor 14.

Normally, when the motor is deenergized, the steel disk 14 will act as an armature and attract the polarized disk 15 to it and pin 17 will be engaged in hole 18. If we assume such condition with the motor deenergized, the starting action may be described as follows:

When the stator is first energized, its flux apparently passes across the air gap largely through disk 14. At this instant disk 14 is, of course, stationary and the rotating magnet field through disk 14 naturally shifts therein in the direction of rotation. Polarized disk 15 is also stationary and because its polarity is fixed, it is repelled from disk 14 by the constantly shifting field therein. Disk 15 thus moves endwise on shaft 13 to some such position as is represented in Fig. 1. As the same time that the disks are separated by repulsion, rotor element 14 starts to turn in the direction of the field with a strong starting torque, since it is designed especially for producing strong starting torque. Such starting may actually occur before the two rotor elements are fully disengaged.

With a field having a rotating component, there is little tendency of the polarized rotor element 15 to start in the wrong direction. Rotor element 15 is further urged to start in the correct direction by the starting of disk 14 while pin 17 is being withdrawn from hole 18. However, the accelerations of the two rotor elements are independent, since they separate by magnetic repulsion simultaneously with the starting of rotation the instant the field is applied.

When the two rotor elements are separated, the polarized rotor is still within some influence of the rotating magnetic field and almost instantly accelerates to synchronous speed and hence does not move endwise beyond the influance of such field. Rotor element 14 accelerates more slowly and its rate of acceleration will depend upon the load connected to shaft 13. As soon as rotor element 15 is running at synchronous speed, it is drawn back toward disk 14 by magnetic attraction, since while disk 14 may not be running at synchronous speed, the field therethrough rotates at synchronous speed, and hence pin 17 contacts the near side of disk 14 and when the disk 18 has accelerated to nearly synchronous speed, pin 17 enters one of the holes 18 and synchronous operation of both rotor elements is established. This complete starting action is so fast that it is difficult to learn just what takes place but it is certain that the disks separate and later draw together.

It is evident that when the motor is thus operating and is then deenergized, the two rotor elements remain in contact because then the only field is that produced by the polarized rotor which closes through and attracts disk 14 as an armature. Hence this is the normal condition when the motor is at rest and again energized. If, during synchronous operation, the motor should be overloaded beyond the pull-out torque of the synchronous element 15, plus such pull-out torque, if any, that is contributed by element 14, the two rotor elements will immediately separate by repulsion, since under this condition the polarized disk is rotating, if at all, below the speed of the rotating magnetic field through disk 14. As soon as separation occurs, the polarized rotor, being free of the load, accelerates to synchronous speed and moves over towards disk 14 in readiness to engage in driving relation therewith as soon as the load decreases to a point where rotor 14 can accelerate it up to a point which will permit pin 17 to enter slot 18. It is thus evident that rotor element 14 may be stopped by overload, leaving rotor element 15 running synchronously. It is also evident that during acceleration the rubbing of pin 17 on disk 14 before the establishment of a direct driving connection is in a direction to assist acceleration of rotor elements 14 and the rubbing surfaces may be designed to have sufficient friction to take full advantage of this.

However, in starting, the polarized rotor element comes up to synchronous speed independently and unloaded and it is only after it reaches synchronous speed that it moves over into frictional, and finally into direct driving relation with the starting rotor element 14.

The starting torque characteristics may be modified to suit various applications. For example, a considerable amount of induction motor torque can be added by plating the steel disk with a conductor coating such as copper. In such cases the magnetic material of disk 14 may be designated to have better permeability and less hysteresis action than would be the case where hysteresis action alone is depended upon for starting torque. In any event rotor element 14 should contain magnetic material in order to obtan the magnetic repulsion and attraction actions above described.

In Fig. 2 I have represented a rotor element embodying my invention in which a thin friction disk 19 such as cork or rubber is provided between the non-polarized starting rotor element and the polarized synchronizing rotor element 15. Such friction material may be secured to the inner side of either or both of the rotor elements. The accelerating and synchronizing action is substantially the same as previously described. If, after the synchronous rotor 15 has reached synchronous speed and is assisting in accelerating the load through frictional rubbing contact with rotor element 14, the torque transmitted should become sufficient to pull rotor 15 out of synchronism, the latter simply moves away from rotor 14 and speeds up to synchronism again. Thus the driving connection between the rotor elements does not need to be adjusted or designed for any particular minimum torque value but may be made such as to transmit even more torque than the synchronous rotor 15 is capable of transmitting, either during the accelerating period of the starting rotor 14 or after synchronism is established, without complicating the structure or interfering with the automatic magnetic clutch action which occurs as needed to separate or connect the two rotor elements. There is no particular time limit or number of revolutions required during the starting period. The motor may completely synchronize in a few cycles or a few seconds, depending upon the inertia of the load and voltage conditions. The rotor element 15 may take the position shown in Fig. 3 during acceleration, while during synchronous operation it takes the position represented in Fig. 4.

Some variation in the attraction force between the two rotors at synchronous speed may be had by variation in diameters of the two rotor elements. For example, if I make the starting rotor disk 14 slightly larger in diameter than the polarized disk 15, as suggested in Fig. 2, the stator flux in passing through the polarized rotor at synchronous speed will tend to flow more fully through the peripheral edges of rotor element 14 and this will increase the magnetic attraction between the two rotor elements at synchronous speed.

However, it does not interfere with the operation of the two rotor elements as an automatic magnetic clutch which engages and disengages as the polarized rotor operates at synchronous or non-synchronous speeds. I have found that making the diameter of the two rotor elements the same gives very satisfactory results.

While the sintered oxide type of polarized rotor retains its permanent magnetism exceptionally well under adverse conditions, it might seem that it might become demagnetized when subjected to the alternating flux field before it reaches synchronous speed. Such is not the case. The fact that the polarized rotor is easily and quickly moved away from the position where it would be subject to severe demagnetizing influences is apparently helpful. Instead of being subjected to severe demagnetizing forces, it is simply repelled away from a position where such forces exist. Of course it is never completely outside the alternating flux field when the motor is energized but before the polarized rotor reaches synchronous speed, the greater part of the alternating flux passes through the starting rotor element 14 and the magnetic forces which might otherwise cause demagnetization of the polarized rotor if it remained secured to rotor 14 at this time simply repel the polarized rotor away. It will be evident that practically all of the time the motor is energized, the polarized rotor is operating in synchronism and hence is related to the rotating magnetic field in a manner so as to become more strongly polarized, if anything. In any event, preventing demagnetization of the polarized rotor is not a problem.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A self-starting synchronous motor comprising means for producing a rotating magnetic field, a rotor element embodying magnetic material and having strong starting characteristics and a synchronizing rotor element having magnetic poles produced by a permanent magnet and also being self-starting in said field, a shaft on which said rotor elements are mounted, said rotor elements being freely relatively movable endwise of said shaft within the influence of said rotating magnetic field and being relatively rotatable with respect to each other when separated along said shaft, and means for establishing a driving connection between said rotor elements only when they are close together.

2. A self-starting synchronous motor comprising means for producing a rotating magnetic field, a shaft, a pair of disk-shaped rotor elements of approximately the same diameter on said shaft within the influence of said field, one of said elements being secured in fixed relation to said shaft and containing magnetic material and having strong starting characteristics, the other rotor element being free to slide along and rotate on said shaft and comprising a diametrically magnetized permanent magnet, and means for establishing a driving connection between said rotor elements only when they are close together.

3. A rotor for a self-starting synchronous motor comprising a shaft, a disk-shaped starting rotor element of hysteresis magnetic material secured to said shaft, a synchronizing rotor element slidably mounted so as to be free to slide and to rotate on said shaft, said last mentioned element comprising a diametrically polarized permanent magnet disk, and a pin and slot type of driving connection between said rotor elements which is ineffective when said elements are separated along said shaft.

4. A rotor for a self-starting synchronous motor comprising a shaft, a pair of disk-shaped magnetic rotor elements on said shaft, one of said rotor elements being secured in fixed relation on said shaft and having strong starting characteristics, the other of said elements comprising permanent magnet material magnetized across a diameter thereof and being free to slide along and to rotate on said shaft, and friction driving means between said rotor elements effective only when said elements are close together on said shaft.

5. A self-starting synchronous motor comprising stator means for producing a rotating magnetic field, a shaft, a self-starting polarized synchronizing rotor element and a starting rotor element on said shaft within the influence of said field, said elements being relatively movable along and around said shaft with respect to each other, the first-mentioned rotor having its magnetic poles spaced for synchronous cooperation with the rotating magnet field and the other rotor element acting as a magnetic armature for said polarized rotor element whereby said rotor elements are normally attracted towards each other along the shaft but are separated by magnetic repulsion when the motor is energized and the synchronizing rotor element is not running in synchronism with the field, and means for establishing a driving connection between said rotor elements when attracted.

6. A self-starting synchronous motor comprising a stator element for producing a rotating magnetic field, a shaft, a two-part rotor on said shaft within the influence of said magnetic field, said rotor elements being relatively rotatable and movable along said shaft with respect to each other, one rotor element containing magnetic material and being especially designed to produce starting torque, the other rotor element comprising a permanent magnet with its poles spaced to cooperate with the rotating magnetic field to produce synchronizing torque and also being self-starting in said field, said rotor elements serving as an automatic magnetic clutch to interrupt and establish driving relation between them as required to expedite the starting and synchronizing operations of said rotor elements.

7. A self-starting synchronous motor comprising stator means for producing a rotating magnetic field, a shaft, a two-element rotor on said shaft within the influence of said magnet field, one element comprising a starting rotor member containing magnetic material and the other element comprising a cylindrical shaped permanent magnet made of sintered oxide and polarized across a diameter thereof, said elements being relatively rotatable and movable along said shaft with respect to each other, said starting rotor element normally serving as an armature for the permanent magnet element to draw the elements together along the shaft to facilitate the establishment of a driving connection between them, said elements being magnetically repelled from each other to interrupt such driving connection only when the motor is energized and the permanent magnet rotor element is not rotating in synchronism with the rotating magnet field.

RALPH G. AREY.